(12) United States Patent  (10) Patent No.: US 9,924,785 B1
Gilmore  (45) Date of Patent: Mar. 27, 2018

(54) WAIST WEARABLE HOLDING DEVICE

(71) Applicant: Allen Gilmore, Sarasota, FL (US)

(72) Inventor: Allen Gilmore, Sarasota, FL (US)

( * ) Notice: Subject to any disclaimer, the term of this patent is extended or adjusted under 35 U.S.C. 154(b) by 0 days.

(21) Appl. No.: 15/376,855

(22) Filed: Dec. 13, 2016

(51) Int. Cl.
  *A01K 97/10* (2006.01)
  *A45F 5/02* (2006.01)
  *A01K 97/08* (2006.01)

(52) U.S. Cl.
  CPC .............. *A45F 5/021* (2013.01); *A01K 97/08* (2013.01); *A01K 97/10* (2013.01)

(58) Field of Classification Search
  CPC  A45F 5/021; A45F 5/02; A01K 97/10; A01K 97/08
  USPC ................................ 224/673, 922, 904, 200
  See application file for complete search history.

(56) References Cited

U.S. PATENT DOCUMENTS

| | | | | |
|---|---|---|---|---|
| 1,174,319 A * | 3/1916 | Hipwood | ............... | A01K 97/10 224/200 |
| 1,985,985 A * | 1/1935 | Gerline | .................. | A01K 97/10 224/200 |
| 2,576,624 A * | 11/1951 | Miller | .................... | A01K 97/10 224/200 |
| 2,954,909 A * | 10/1960 | Miller | .................... | A01K 97/10 224/200 |
| 2,995,855 A * | 8/1961 | Bell | ........................ | A01K 97/10 43/21.2 |
| 3,009,612 A * | 11/1961 | Fischett | ................ | A01K 97/10 224/200 |
| 3,885,721 A * | 5/1975 | Vanus | .................... | A01K 97/10 224/200 |
| 4,569,466 A * | 2/1986 | Webber | .................. | A01K 97/10 224/268 |
| D295,776 S * | 5/1988 | Johansen | ....................... | 224/200 |
| 4,802,612 A * | 2/1989 | Anderson | ............. | A01K 97/00 224/200 |
| 4,828,152 A * | 5/1989 | Pepping | ................. | A01K 97/10 224/200 |
| 4,858,364 A * | 8/1989 | Butts | ....................... | A01K 97/10 224/200 |
| 5,014,891 A * | 5/1991 | King | ...................... | A01K 97/10 224/200 |
| 5,511,336 A * | 4/1996 | Bishop | ................... | A01K 97/10 224/673 |
| 5,520,312 A * | 5/1996 | Maddox | ................. | A01K 97/10 224/200 |
| 5,573,167 A | 11/1996 | Bebb et al. | | |
| 5,813,162 A * | 9/1998 | Tse | .......................... | A01K 97/10 224/200 |

(Continued)

FOREIGN PATENT DOCUMENTS

WO  WO2011135467  11/2011

*Primary Examiner* — Adam Waggenspack
*Assistant Examiner* — Lester L Vanterpool

(57) ABSTRACT

A waist wearable holding device for pivotally coupling items to a user includes a panel that is substantially conformable to a hip of a user. A belt is coupled to the panel. The belt is configured to couple to the user with the belt positioned around a waist of the user and the panel positioned proximate to the hip of the user. A tube is pivotally coupled to the panel. The tube is open ended. The tube is configured to selectively insert tubular elements of items, such as a handle of a fishing rod and a pole of a fishing net. The item is pivotally coupled to the user, freeing hands of the user for other activities.

11 Claims, 5 Drawing Sheets

(56) References Cited

U.S. PATENT DOCUMENTS

| | | | | |
|---|---|---|---|---|
| 5,992,717 | A * | 11/1999 | Clewes | A01K 97/10 224/200 |
| 6,003,746 | A * | 12/1999 | Richardson | A01K 97/10 224/162 |
| 6,029,872 | A * | 2/2000 | Ellington | A01K 97/10 224/251 |
| 6,209,253 | B1 | 4/2001 | Saldana, Jr. | |
| 6,237,821 | B1 * | 5/2001 | Owen | A01K 97/10 224/197 |
| 6,591,542 | B1 * | 7/2003 | Jordan | A01K 97/10 224/922 |
| 8,690,035 | B2 * | 4/2014 | Silverman | A01K 97/10 224/261 |
| 2003/0006259 | A1 * | 1/2003 | Campana | A45F 5/00 224/268 |

* cited by examiner

WAIST WEARABLE HOLDING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to holding devices and more particularly pertains to a new holding device for pivotally coupling items to a user.

BRIEF SUMMARY OF THE INVENTION

An embodiment of the disclosure meets the needs presented above by generally comprising a panel that is substantially conformable to a hip of a user. A belt is coupled to the panel. The belt is configured to couple to the user with the belt positioned around a waist of the user and the panel positioned proximate to the hip of the user. A tube is pivotally coupled to the panel. The tube is open ended. The tube is configured to selectively insert tubular elements of items, such as a handle of a fishing rod and a pole of a fishing net. The item is pivotally coupled to the user, freeing hands of the user for other activities.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
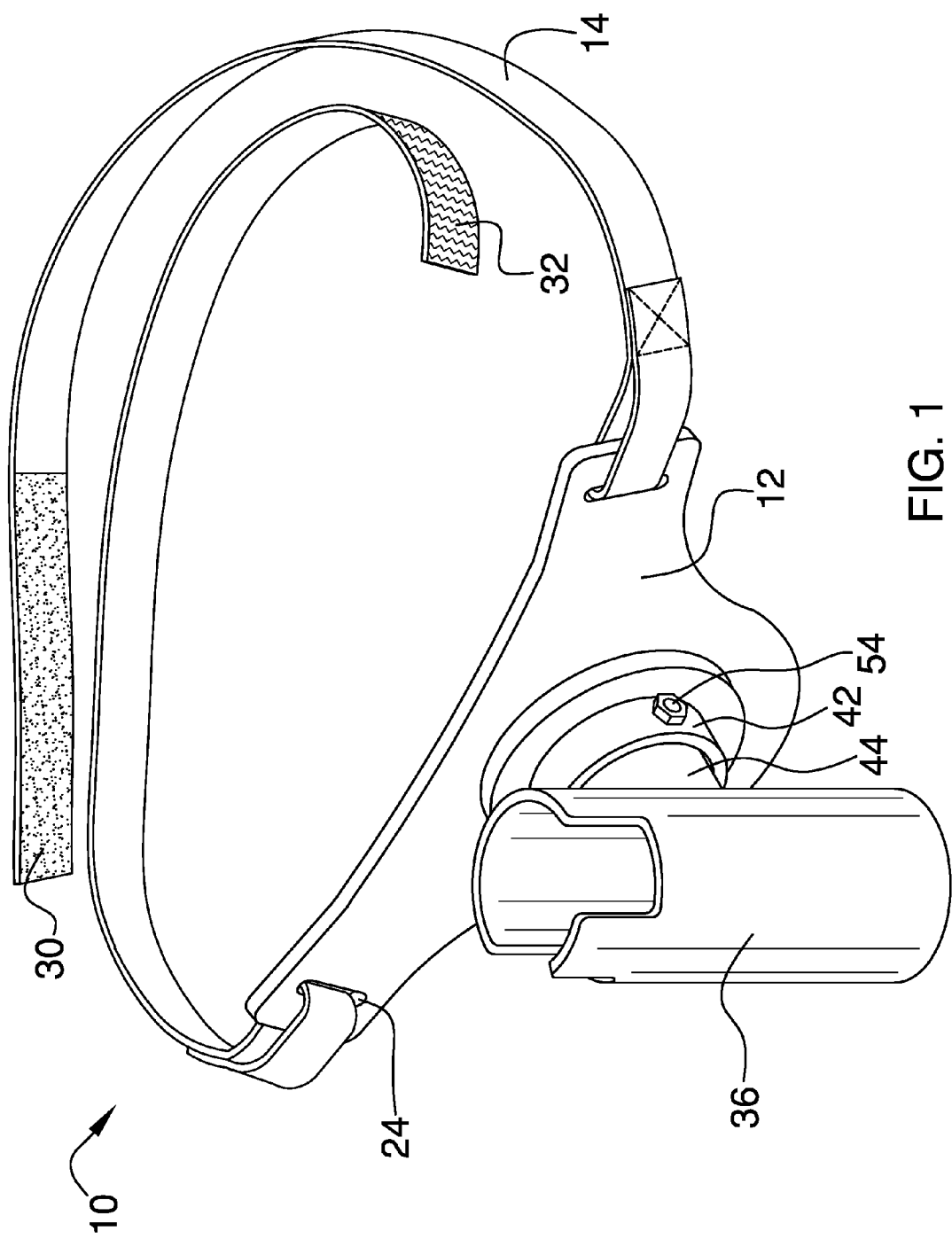
FIG. 1 is an isometric perspective view of a waist wearable holding device according to an embodiment of the disclosure.
Figure 2:
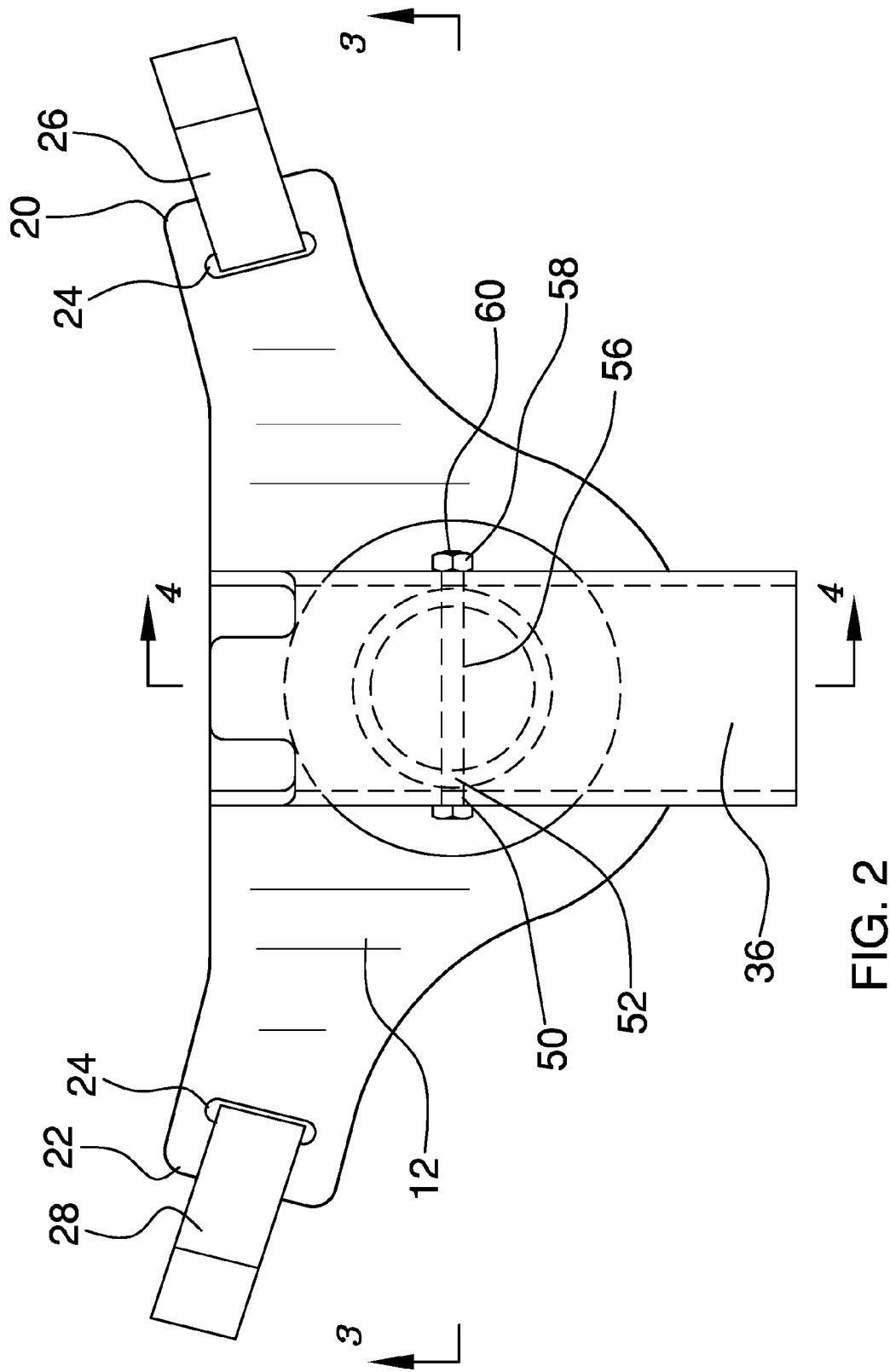
FIG. 2 is a front view of an embodiment of the disclosure.
Figure 3:
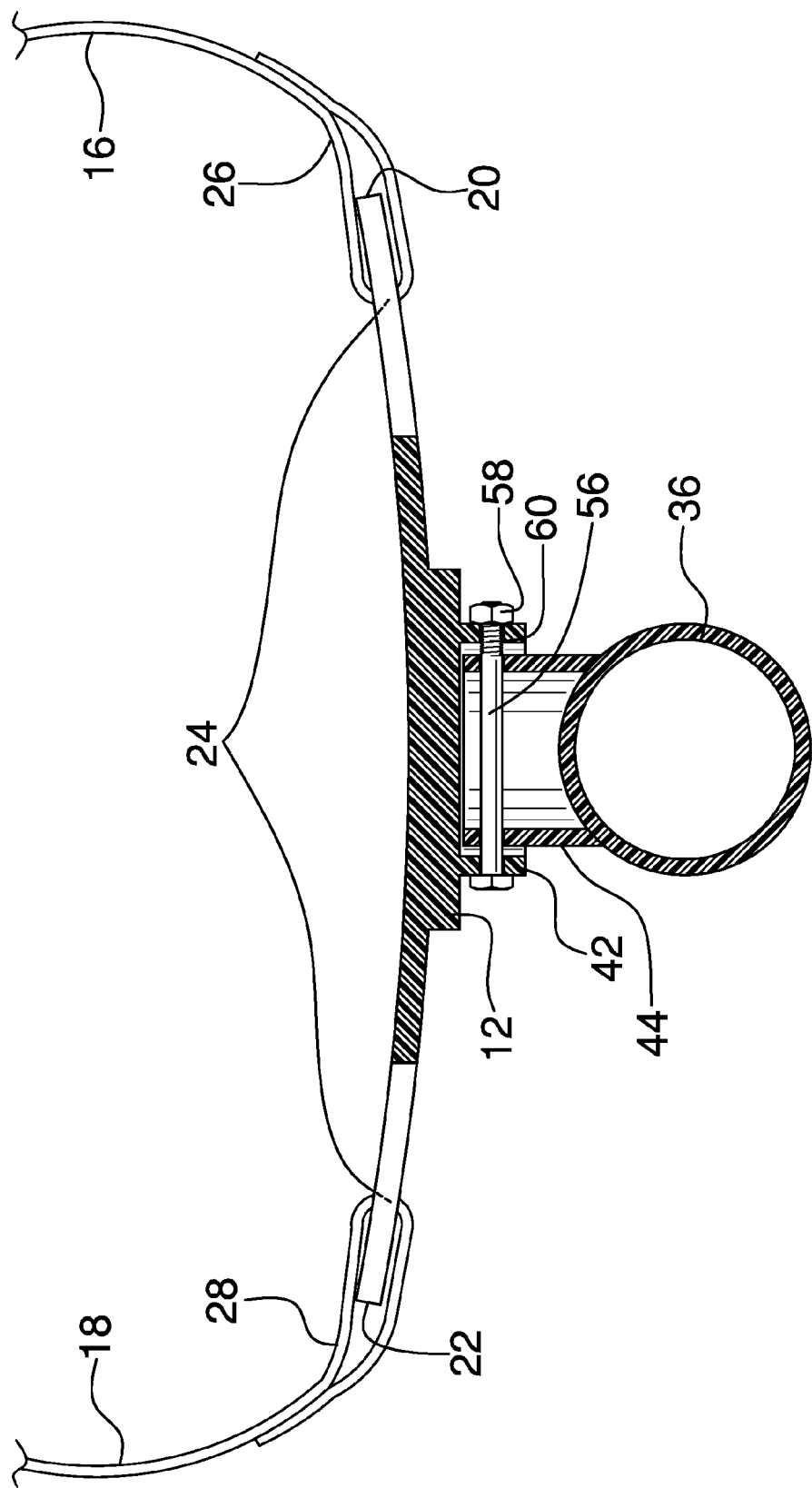
FIG. 3 is a cross-sectional view of an embodiment of the disclosure.
Figure 4:
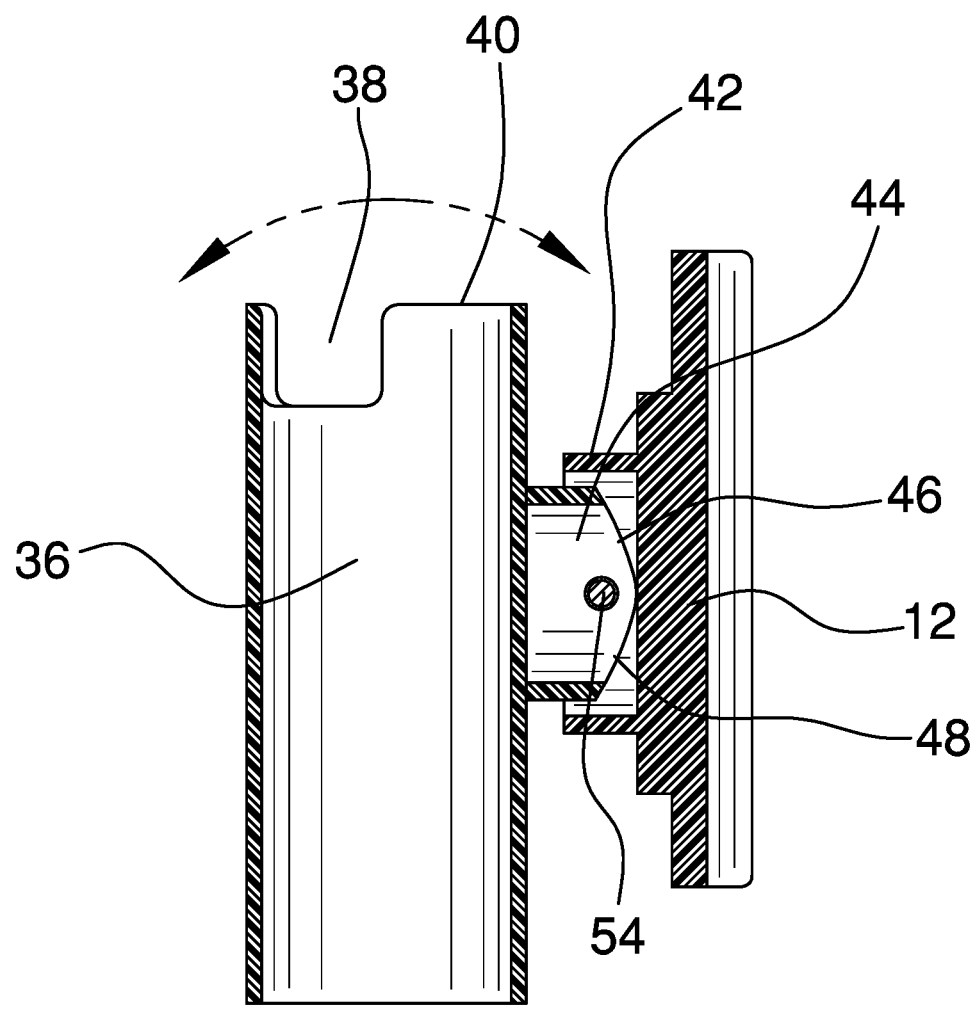
FIG. 4 is a cross-sectional view of an embodiment of the disclosure.
Figure 5:
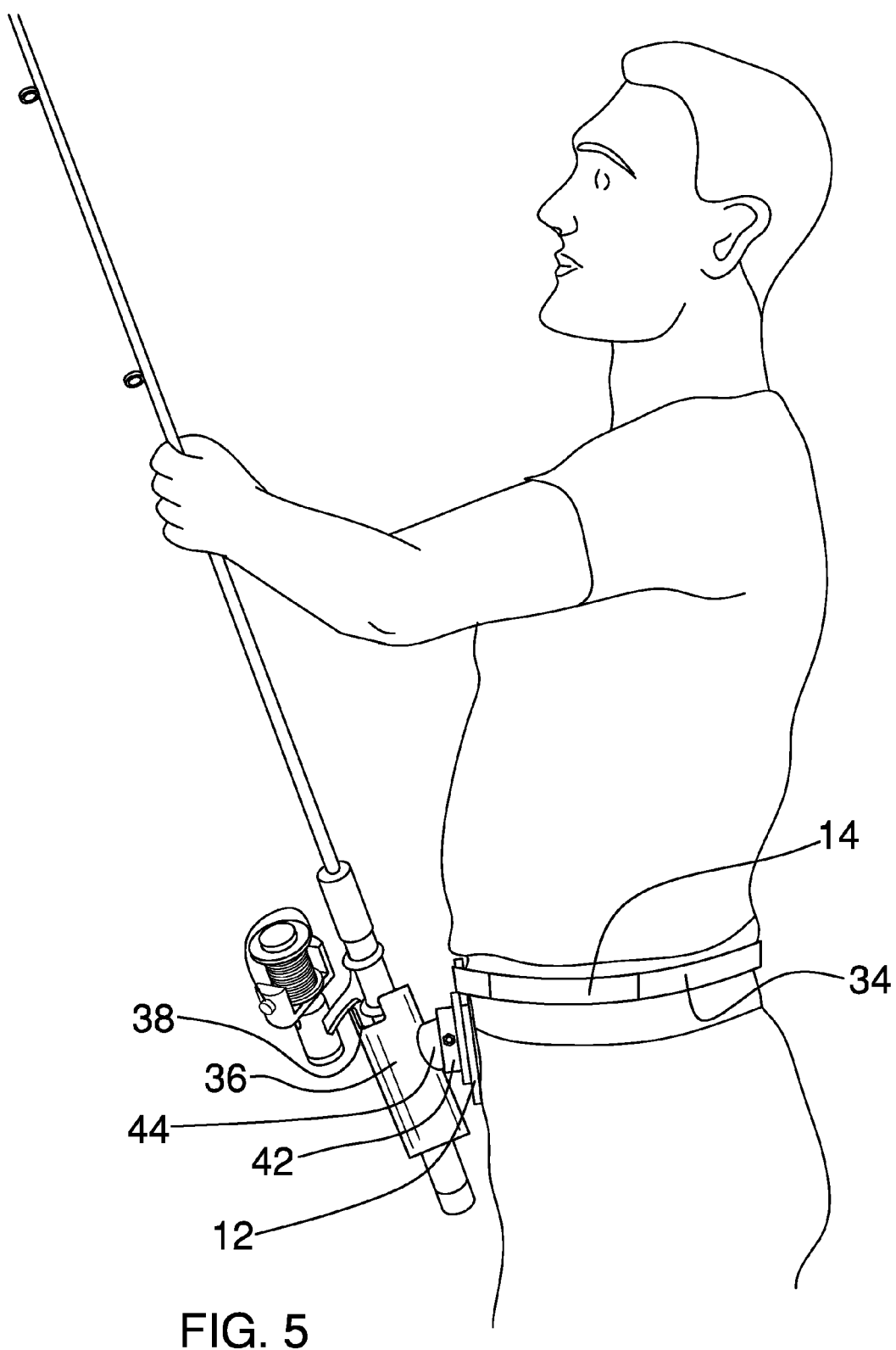
FIG. 5 is an in-use view of an embodiment of the disclosure.

With reference now to the drawings, and in particular to FIGS. 1 through 5 thereof, a new holding device embodying the principles and concepts of an embodiment of the disclosure and generally designated by the reference numeral 10 will be described.

As best illustrated in FIGS. 1 through 5, the waist wearable holding device 10 generally comprises a panel 12 that is substantially conformable to a hip of a user. A belt 14 is coupled to the panel 12. The belt 14 is configured to couple to the user with the belt 14 positioned around a waist of the user and the panel 12 positioned proximate to the hip of the user. In one embodiment, the belt 14 comprises a first strap 16 and a second strap 18. The first strap 16 is coupled to and extends from a first end 20 of the panel 12. The second strap 18 is coupled to and extends from a second end 22 of the panel 12.

A pair of slots 24 is positioned singly through the panel 12 proximate to the first end 20 and the second end 22 of the panel 12. The first strap 16 is stitchedly coupled to the first strap 16 and defines a first loop 26. The first loop 26 is positioned through a respective slot 24 to couple the first strap 16 to the first end 20 of the panel 12. The second strap 18 is stitchedly coupled to the second strap 18 and defines a second loop 28. The second loop 28 is positioned through a respective slot 24 to couple the second strap 18 to the second end 22 of the panel 12.

A first coupler 30 is coupled to the first strap 16 distal from the panel 12. A second coupler 32 is coupled to the second strap 18 distal from the panel 12. The second coupler 32 is complementary to the first coupler 30. The first strap 16 and the second strap 18 are configured to position around the waist of the user. The second coupler 32 is positioned to couple to the first coupler 30 to couple the belt 14 to the user. In one embodiment, the first coupler 30 and the second coupler 32 comprises a hook and loop fastener 34. In another embodiment, the first coupler 30 extends along the first strap 16 toward the panel 12. The second coupler 32 extends along the second strap 18 toward the panel 12. The first coupler 30 and the second coupler 32 are selectively positionable such that the belt 14 is variably sizable.

A tube 36 is pivotally coupled to the panel 12. The tube 36 is open ended. The tube 36 is configured to selectively insert tubular elements of items, such as a handle of a fishing rod and a pole of a fishing net. The item is pivotally coupled to the user, freeing hands of the user for other activities. In one embodiment, the tube 36 is substantially circularly shaped when viewed longitudinally. In another embodiment, a pair of cutouts 38 is positioned in the tube 36. The cutouts 38 are alignably positioned adjacent to a top 40 of the tube 36.

A first ring 42 is coupled to and extends from the panel 12. The first ring 42 is positioned substantially equally distant from the first end 20 and the second end 22 of the panel 12. A second ring 44 is coupled to and extends from the tube 36. The second ring 44 is positioned proximate to the top 40 of the tube 36. The second ring 44 is circumferentially smaller than the first ring 42. The second ring 44 is positioned to insert into the first ring 42. The second ring 44 is pivotally coupled to the first ring 42. The second ring 44 has a top bevel 46 and a bottom bevel 48 that are positioned distal from the tube 36. The top bevel 46 and the bottom bevel 48 are positioned in the second ring 44 such that the second ring 44 is positioned to pivot within the first ring 42.

A pair of first holes 50 is opposingly positioned through the first ring 42. A pair of second holes 52 is opposingly positioned through the second ring 44. The second holes 52 are complementary to and alignable with the first holes 50. A pivot pin 54, which is complementary to the first holes 50 and the second holes 52, is positioned through the first holes 50 and the second holes 52 to pivotally couple the second ring 44 to the first ring 42. In one embodiment, the pivot pin 54 comprises a bolt 56 and a nut 58. The bolt 56 is positioned through the first holes 50 and the second holes 52 such that a threaded end 60 of the bolt 56 protrudes from the first ring 42. The nut 58 is threadedly coupled to the threaded end 60 of the bolt 56 to pivotally couple the second ring 44 to the first ring 42. In another embodiment, the bolt 56 and the nut 58 comprise stainless steel.

In use, the first strap 16 and the second strap 18 are configured to position around the waist of the user. The second coupler 32 is positioned to couple to the first coupler 30 to couple the belt 14 to the user. The panel 12 is selectively positionable proximate to the hip of the user. The pivot pin 54 is positioned through the first holes 50 and the second holes 52 to pivotally couple the second ring 44 to the first ring 42. The tube 36 is coupled to the second ring 44 and is configured to selectively insert tubular elements of items, such as the handle of the fishing rod and the pole of the fishing net. The item is pivotally coupled to the user, freeing the hands of the user for other activities.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A waist wearable holding device comprising:
   a panel, said panel being conformable to a hip of a user;
   a belt coupled to said panel, said belt being configured for coupling to the user such that said belt is positioned around a waist of the user positioning said panel proximate to the hip of the user;
   a tube pivotally coupled to said panel, said tube being open ended;
   wherein said tube is positioned on said panel such that said tube is configured for selectively inserting tubular elements of items, such as a handle of a fishing rod and a pole of a fishing net, such that the item is pivotally coupled to the user, freeing hands of the user for other activities;
   a first ring coupled to and extending from said panel, said first ring being positioned equally distant from said first end and said second end of said panel;
   a second ring coupled to and extending from said tube, said second ring being positioned proximate to said top of said tube, said second ring being circumferentially smaller than said first ring such that said second ring is positioned for inserting into said first ring, said second ring being pivotally coupled to said first ring, said second ring having a top bevel and a bottom bevel positioned distal from said tube;
   wherein said top bevel and said bottom bevel are positioned in said second ring such that said second ring is positioned to pivot within said first ring;
   a pair of first holes opposingly positioned through said first ring;
   a pair of second holes opposingly positioned through said second ring, said second holes being complementary to said first holes such that said second holes are alignable with said first holes; and
   a pivot pin complementary to said first holes and said second holes, said pivot pin being positioned through said first holes and said second holes such that said second ring is pivotally coupled to said first ring.

2. The device of claim 1, further including said belt comprising a first strap and a second strap, said first strap being coupled to and extending from a first end of said panel, said second strap being coupled to and extending from a second end of said panel.

3. The device of claim 2, further including a pair of slots, said slots being positioned through said panel singly proximate to said first end and said second end of said panel, said first strap being stitchedly coupled to said first strap defining a first loop, said first loop being positioned through a respective said slot such that said first strap is coupled to said first end of said panel, said second strap being stitchedly coupled to said second strap defining a second loop, said second loop being positioned through a respective said slot such that said second strap is coupled to said second end of said panel.

4. The device of claim 2, further comprising:
   a first coupler coupled to said first strap distal from said panel;
   a second coupler coupled to said second strap distal from said panel, said second coupler being complementary to said first coupler; and
   wherein said first strap and said second strap are configured for positioning around the waist of the user such that said second coupler is positioned to couple to said first coupler to couple said belt to the user.

5. The device of claim 4, further including said first coupler and said second coupler comprising a hook and loop fastener.

6. The device of claim 5, further including said first coupler extending along said first strap toward said panel, said second coupler extending along said second strap toward said panel such that said first coupler and said second coupler are selectively positionable such that said belt is variably sizable.

7. The device of claim 1, further including said tube being circularly shaped when viewed longitudinally.

8. The device of claim 1, further including a pair of cutouts positioned in said tube, said cutouts being alignably positioned adjacent to a top of said tube.

9. The device of claim 1, further including said pivot pin comprising a bolt and a nut, said bolt being positioned through said first holes and said second holes such that a threaded end of said bolt protrudes from said first ring, said nut being threadedly coupled to said threaded end of said bolt such that said second ring is pivotally coupled to said first ring.

10. The device of claim 9, further including said bolt and said nut comprising stainless steel.

11. A waist wearable holding device comprising:
a panel, said panel being conformable to a hip of a user;
a belt coupled to said panel, said belt being configured for coupling to the user such that said belt is positioned around a waist of the user positioning said panel proximate to the hip of the user, said belt comprising a first strap and a second strap, said first strap being coupled to and extending from a first end of said panel, said second strap being coupled to and extending from a second end of said panel;
a pair of slots, said slots being positioned through said panel singly proximate to said first end and said second end of said panel, said first strap being stitchedly coupled to said first strap defining a first loop, said first loop being positioned through a respective said slot such that said first strap is coupled to said first end of said panel, said second strap being stitchedly coupled to said second strap defining a second loop, said second loop being positioned through a respective said slot such that said second strap is coupled to said second end of said panel;
a first coupler coupled to said first strap distal from said panel;
a second coupler coupled to said second strap distal from said panel, said second coupler being complementary to said first coupler, wherein said first strap and said second strap are configured for positioning around the waist of the user such that said second coupler is positioned to couple to said first coupler to couple said belt to the user, said first coupler and said second coupler comprising a hook and loop fastener, said first coupler extending along said first strap toward said panel, said second coupler extending along said second strap toward said panel such that said first coupler and said second coupler are selectively positionable such that said belt is variably sizable;
a tube pivotally coupled to said panel, said tube being open ended, wherein said tube is positioned on said panel such that said tube is configured for selectively inserting tubular elements of items, such as a handle of a fishing rod and a pole of a fishing net, such that the item is pivotally coupled to the user, freeing hands of the user for other activities, said tube being circularly shaped when viewed longitudinally;
a pair of cutouts positioned in said tube, said cutouts being alignably positioned adjacent to a top of said tube;
a first ring coupled to and extending from said panel, said first ring being positioned equally distant from said first end and said second end of said panel;
a second ring coupled to and extending from said tube, said second ring being positioned proximate to said top of said tube, said second ring being circumferentially smaller than said first ring such that said second ring is positioned for inserting into said first ring, said second ring being pivotally coupled to said first ring, said second ring having a top bevel and a bottom bevel positioned distal from said tube, wherein said top bevel and said bottom bevel are positioned in said second ring such that said second ring is positioned to pivot within said first ring;
a pair of first holes opposingly positioned through said first ring;
a pair of second holes opposingly positioned through said second ring, said second holes being complementary to said first holes such that said second holes are alignable with said first holes;
a pivot pin complementary to said first holes and said second holes, said pivot pin being positioned through said first holes and said second holes such that said second ring is pivotally coupled to said first ring, said pivot pin comprising a bolt and a nut, said bolt being positioned through said first holes and said second holes such that a threaded end of said bolt protrudes from said first ring, said nut being threadedly coupled to said threaded end of said bolt such that said second ring is pivotally coupled to said first ring, said bolt and said nut comprising stainless steel; and
wherein said first strap and said second strap are configured for positioning around the waist of the user, such that said second coupler is positioned to couple to said first coupler to couple said belt to the user, wherein said panel is selectively positionable proximate to the hip of the user, wherein said pivot pin is positioned through said first holes and said second holes such that said second ring is pivotally coupled to said first ring, wherein said tube is coupled to said second ring such that said tube is configured for selectively inserting tubular elements of items, such as the handle of the fishing rod and the pole of the fishing net, such that the item is pivotally coupled to the user, freeing the hands of the user for other activities.

* * * * *